(12) United States Patent
Chen et al.

(10) Patent No.: US 7,908,397 B1
(45) Date of Patent: Mar. 15, 2011

(54) APPLICATION SERVER GATEWAY TECHNOLOGY

(75) Inventors: Xu Chen, Framingham, MA (US);
Thomas Jordahl, Arlington, MA (US);
Damon Cooper, Framingham, MA (US)

(73) Assignee: Adobe Systems Incorporated, San Jose, CA (US)

( * ) Notice: Subject to any disclaimer, the term of this patent is extended or adjusted under 35 U.S.C. 154(b) by 1206 days.

(21) Appl. No.: 11/069,932

(22) Filed: Feb. 28, 2005

(51) Int. Cl.
G06F 15/16 (2006.01)
H04J 3/22 (2006.01)

(52) U.S. Cl. ......................... 709/246; 370/466
(58) Field of Classification Search .................. 455/466; 709/246; 370/466
See application file for complete search history.

(56) References Cited

U.S. PATENT DOCUMENTS

| | | | |
|---|---|---|---|
| 5,754,774 A | 5/1998 | Bittinger et al. | |
| 6,321,257 B1* | 11/2001 | Kotola et al. | 709/219 |
| 6,654,794 B1 | 11/2003 | French | |
| 6,745,259 B2 | 6/2004 | Wagner | |
| 6,820,133 B1 | 11/2004 | Grove et al. | |
| 6,836,796 B2 | 12/2004 | Schwartz et al. | |
| 6,857,008 B1 | 2/2005 | Shenefiel | |
| 6,961,330 B1* | 11/2005 | Cattan et al. | 370/352 |
| 7,127,264 B2* | 10/2006 | Hronek et al. | 455/466 |
| 2002/0087408 A1* | 7/2002 | Burnett | 705/14 |
| 2003/0046355 A1* | 3/2003 | Rosenberg et al. | 709/206 |
| 2003/0078032 A1* | 4/2003 | Pei et al. | 455/411 |
| 2004/0156495 A1 | 8/2004 | Chava et al. | |
| 2005/0021610 A1 | 1/2005 | Bozionek et al. | |
| 2005/0021826 A1 | 1/2005 | Kumar | |
| 2006/0013502 A1* | 1/2006 | Weigand | 382/275 |
| 2006/0064307 A1* | 3/2006 | Pakkala | 705/1 |

FOREIGN PATENT DOCUMENTS

| | | |
|---|---|---|
| WO | WO 01/80534 | 10/2001 |
| WO | WO 02/15603 | 2/2002 |
| WO | WO 02/060167 | 8/2002 |

* cited by examiner

*Primary Examiner* — Aaron Strange
(74) *Attorney, Agent, or Firm* — Kilpatrick Townsend & Stockton LLP (57) ABSTRACT

Interfacing communication between a non-hypertext transfer protocol (HTTP) event source and an application server function is described by calling a listener method to detect one or more events received from a non-HTTP event source. Data from the events is extracted and assembled into an application server event (AS Event) message. The AS Event message is transmitted to the application server function, which uses data from the AS Event to process its functionality. Resulting information may be sent to a communication method, which formats a message for the non-HTTP event source using the resulting information. This formatted message is then communicated to the non-HTTP event source. The interfaced communication may be initiated either by the non-HTTP event source or the application server function.

12 Claims, 5 Drawing Sheets

APPLICATION SERVER GATEWAY TECHNOLOGY

TECHNICAL FIELD

The present invention relates, in general, to application servers and, more specifically, to application server gateway technology.

BACKGROUND OF THE INVENTION

As the electronic world continues to evolve, computers and the Internet have infiltrated more and more day-to-day activities. What began as a network for scientists to exchange research and writings has grown into the information superhighway where vast amounts of data and services are exchanged in the everyday conduct of business. The transmission of all of this data is assisted through the hypertext transfer protocol (HTTP), the standard transport protocol for the Internet. At the beginning of the World Wide Web (Web), static hypertext markup language (HTML) documents were stored on Web servers, which are also sometimes referred to as HTTP servers. A Web browser would send an HTTP request to a Web server, which then accesses and delivers the requested Web page or HTML file back to the requesting user's Web browser, again over HTTP. The HTML content is then rendered in the Web browser for the user to view. HTML is a markup language that uses tags or metadata to define the appearance or style of the data within the file. Web browsers interpret these tags and render the data onto the screen according to the defined format or styling. While this process allows for the presentation of graphically-oriented material, it is a static interaction; without the ability to interact dynamically with the user.

With the advent of common gateway interface (CGI) scripts and HTML forms, the first interactive Websites were developed. Data entered by a user in an HTML form was extracted by the CGI script, which interacted with a backend database to retrieve requested data. The CGI script would then format the resulting information into an HTML page and send it back via HTTP to the requesting user's Web server for display. These primitive interactive Websites have now evolved into complex application servers that provide many types of complex business logic or data access to user's Web browsers.

Application servers, such as MACROMEDIA, INC.'s COLDFUSION™, IBM's WEBSPHERE APPLICATION SERVER™, BEA's WEBLOGIC™, MICROSOFT CORPORATION's WEB SERVER SYSTEM™, and the like, essentially comprise software in an Internet or intranet environment that host a variety of language systems to program database queries and/or perform general processing. Such language systems include SUN MICROSYSTEMS, INC.'s JAVA™-based platforms, such as the JAVA™ 2 PLATFORM, ENTERPRISE EDITION (J2EE), which uses logic modules, such as ENTERPRISE JAVABEANS™ (EJBs), JAVASERVER PAGES™ (JSPs), JAVA™ servlets, and the like, written in JAVA™ to link the information resources to the enterprise. COLDFUSION™ uses another such language system, COLDFUSION™ MARKUP LANGUAGE™ (CFML™), to script applications or components to perform the server-side logic. COLDFUSION™ logic modules include codes sets such as, COLDFUSION™ components (CFC).

The common thread throughout application server technology is the use of HTTP as a transport mechanism. Moreover, application servers perform tasks in a typically synchronous, client-server architecture, where the client issues an HTTP request to the server, waits for the server to process and then respond to the request via HTTP before going on. Web browsers issue requests to the application server over HTTP, while the application server packages the results and sends them back out over HTTP formatted in HTML. Because the application server generates the HTML to be displayed by the Web browser, the Web browser synchronously waits for the response from the application server. While this standard platform allows complex transactions to take place over the Internet, the application server, along with the logic that it represents, is typically accessible only through HTTP.

As electronic technologies increase, additional devices that are not typically considered Internet appliances are increasingly accessing the Internet. For example, mobile phones have begun to access the Internet through Wireless Access Protocol (WAP) or lightened versions of HTTP. Traditionally, however, services or logic functionality has been provided to mobile phones through the textual communication of Short Messaging Service (SMS). SMS is a pervasive, global standard for sending and receiving text messages to and/or from mobile phones and devices. Typically, SMS servers, referred to SMS Centers (SMSC) provide SMS accounts to users and an interface to the mobile network. SMS messages are transported using Short Message Peer-to-Peer protocol (SMPP). The SMSC uses SMPP to communicate its messages to the users.

Many different communication services exist that send SMS messages to phone subscribers. Subscribers typically register over the Internet for a service, such as a weather service, sports service, or the like, in which desired information is gathered and sent to the user's mobile phone using SMS messages. Some SMS services are event-driven, which means that they monitor something and react if an event happens. For example, some SMS weather services will send out an SMS message if a National Weather Service warning is issued in a certain area. The applications that run these services are typically combined with SMSCs that access the mobile communication network. However, because SMS services do not communicate via HTTP, mobile phones could not use SMS messaging to access similar services provided to Internet users through application servers. Moreover, because application servers are typically synchronous, request-driven applications and not event-driven, SMS services, such as the described weather service, could not generally be implemented in an application server.

Furthermore, building and deploying SMS mobile-enabled applications is typically complex and costly. Even for simple response or menu-based applications, knowledge of telecommunication session management, telecommunications routing, and the like is usually required. The developer or enterprise building the application also typically provides other telecommunication related considerations, such as scalability, failsafe mechanisms, throttling, metering, monitoring, logging, and/or automatic rebinding capabilities. Such implementation requirements are generally limited to larger, well capitalized entities.

Additional electronic technologies, such as Instant Messaging (IM) services, are also growing in popularity as a method for communication over the Internet and other types of networks. IM services, which are defined with such protocols as Internet Relay Chat (IRC) Extensible Messaging and Presence Protocol (XMPP) and the like, set up client-server relationships with each participating user. As user's log into the IM server, they may send messages or data to other users logged into or members of the IM service. The messages are sent in real time to the server and then from the server to the target user using the transport protocol. Therefore, an IM message may not typical access application server logic without first being converted into an HTTP request through an intermediate server.

Application server logic and technology provide complex processing and services to users accessing their logic through Web browsers and the HTTP Internet. However, this processing logic generally is recoded if it is desired to provide the logic to other technologies, such as mobile phones, through SMS, IM, and the like. This recoding of logic costs service providers considerable resources to create different versions of the same logic for use by different technologies. Other attempts to converge the various protocols and features entail merely translating non-HTTP messages into HTTP. However, in order to create a system in which the non-HTTP request will be recognized and useful to the HTTP-driven applications, substantial modifications to either the request or the HTTP application is still required.

BRIEF SUMMARY

The present invention is directed to a system and method for providing access to application server functionality by external entities that do not communicate using HTTP, the protocol typically used by the Internet or application server technology. One or more event gateways are designed for use in an application server environment. These event gateways serve to listen for external events arriving in a selected communication format. For example, an event gateway may listen for SMPP events coming from an SMS system, IMPP events coming from an IM system, or the like.

Each event gateway type is defined to listen for a certain communication protocol and each instance of such an event gateway type is associated with a specific set of application server logic, function, or component. It is also designed to extract certain relevant data from the external event and re-package the extracted data into a common data structure, application server event format, or object format that may be used by the application server logic, function, or component. Therefore, as a non-HTTP event addressed to the specific application server logic or component is detected by the event gateway within the application server environment, it strips out the selected data, re-packages it into the common application server event format, and sends it to the particular application server logic set or component for execution of the functionality.

Application server code may also be written to handle events asynchronously, such as by initiating messages to be sent out to the external entities. Unlike traditional application server architecture, which has been a synchronous, client-server/request-response paradigm, the various embodiments of the present invention may use code that triggers a message to be sent from the application server component or code to an external device. Events may be received or transmitted asynchronously without requiring a response to the communication before further action. In such applications, the event gateway also includes a software method that can re-package the message from the application server into the appropriate non-HTTP format of the targeted device.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
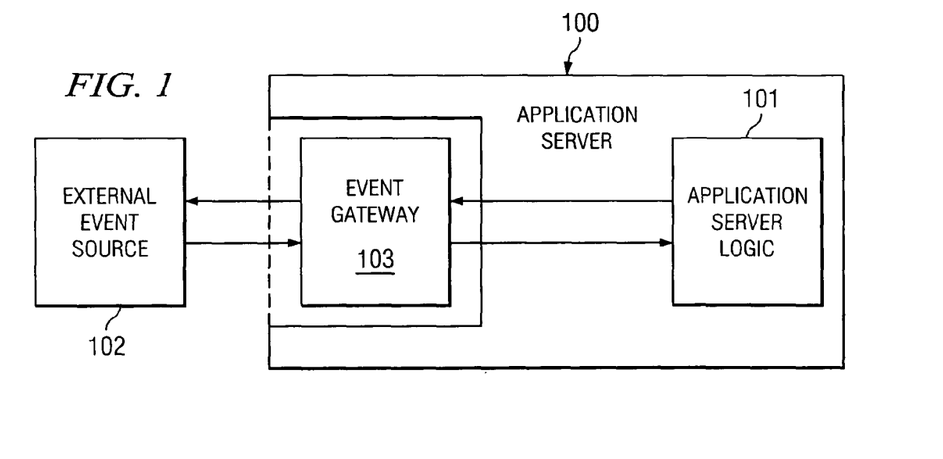
FIG. 1 is a block diagram illustrating an application server configured according to one embodiment of the present invention.

FIG. 1 is a block diagram illustrating application server 100 configured according to one embodiment of the present invention. Application server 100 comprises software stored on a server computer. It provides a container or operating environment for application server logic to run in, as defined in components, functions, or code, such as application server component 101. External event source 102 is an entity, such as an SMSC server, an IM server, or the like that does not communicate using HTTP.

According to the described embodiment, external event source 102 may obtain access to application server component 101 through event gateway 103. External event source 102 may therefore execute the logic of application server component 101, even though it does not communicate using HTTP and even though the logic of external events source 102 has not been modified to interact differently than normal. The type of gateway for event gateway 103 may be defined and coded using various Web-related languages, such as SUN MICROSYSTEMS INC.'s JAVA™, MICROSOFT CORPORATION's J#™, J++™, or the like. When creating the instance of event gateway 103, the developer defines the instance by referring to the event type. Event gateway 103 may be analogized to plug-in technology. Plug-in technology comprises auxiliary code segments that operate with larger programs or applications to enhance or supplement operation of the larger program. For example, plug-ins may be installed into a user's Web browser that enables the Web browser to play and/or display certain non-HTML files. However, the various embodiments of the present invention differ substantially from plug-ins as, among other reasons, event gateway 103 is utilized on the server-side of the Web server-client relationship. Moreover, event gateway 103 does not simply execute the logic received from the external event source 102 on application server 100 or allow a particular file-type to execute on application server 100.

One of the primary functions of event gateway 103 is to listen for events coming from external event sources 102. An event gateway type, such as the instance of event gateway 103, is coded to listen for events arriving on a particular communication protocol. For example, an SMS event gateway would be coded to listen for events coming in SMPP protocol (or other SMS-compatible protocol), IM event gateway may be coded to listen for events coming in XMPP protocol (or other such IM-related protocol), other gateways may listen on a particular IP socket. Event gateway 103 receives the event messages in the various formats and/or protocols, strips certain message data from the event message, and re-packages it into an object, structure, format and/or protocol compatible with application server 100, i.e., an Application Server Event (AS Event) object, structure, or message. An AS Event message will typically include the addresses of the source and destination of the message, the type of event gateway that is being used, the content of the external event, and any other information that the developer has designed for operation with the application server code. Once re-packaged, event gateway 103 sends the AS Event message to the particular functionality, application server component 101, for executing the function using the data from the source event.

Some application server logic may process the information and return resulting information. This resulting information is then packaged into the AS Event format and sent back to event gateway 103, which initiated the call to application server logic 101. The event gateway takes the AS Event-formatted message, strips certain information from the message structure, re-packages the information into the format and/or protocol associated with external event source 102, and transmits the re-formatted information to external event source 102 using the corresponding transmission protocol.

Figure 2:
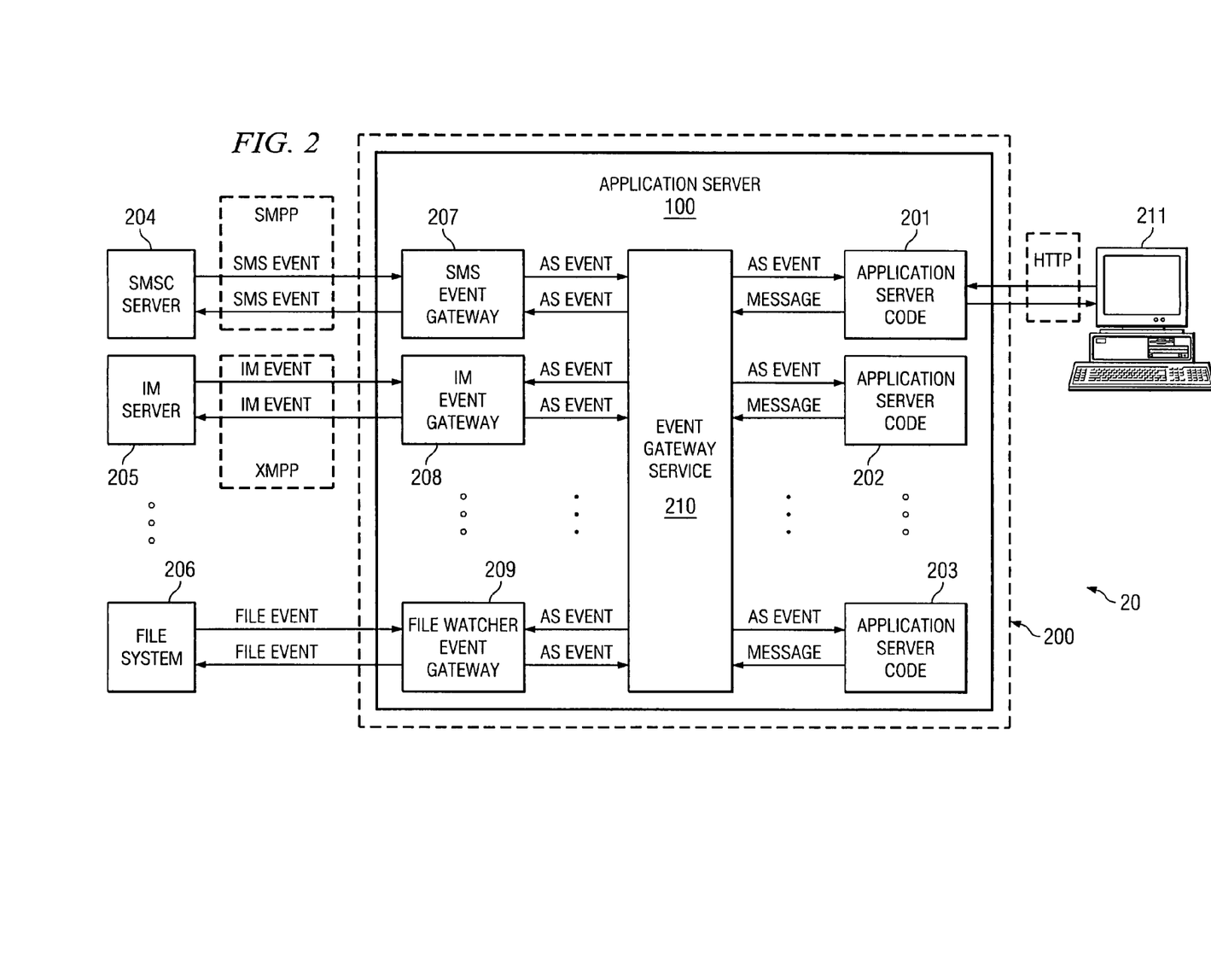
FIG. 2 is a block diagram illustrating an application server gateway architecture configured according to one embodiment of the present invention.

FIG. 2 is a block diagram illustrating application server gateway architecture 20 configured according to one embodiment of the present invention. For purposes of this example, application server 100 is a COLDFUSION™ application server. According to the described embodiment, independent event sources, such as SMSC server 204, IM server 205, and file system 206, each may obtain access to application server logic, such as application server code 201-203, through event gateway instances, such as SMS event gateway 207, IM event gateway 208, and file system event gateway 209. Application server code 201-203 define certain functionality that is available to Web clients, as well as independent non-Web clients that have corresponding event gateway instances installed in application server 100. Thus, these independent event sources may access and utilize the application server logic even though they do not communicate through HTTP. For example, SMSC server 204 communicates using SMPP protocol; IM server 205 communicates using XMPP protocol; and file system 206 communicates using internal operating system command calls.

In operation of SMS event gateway 207, a link is established between SMS event gateway 207 and SMSC server 204. Establishing this link is common in SMS transactions. The link may be initiated by SMS event gateway 207 or by SMSC server 204 depending on the gateway application. Once a link is established, in which the link is initiated by SMSC server 204, SMS event gateway 207 receives an SMS event or message over SMPP protocol. An SMS event or message includes the message content, in addition to administrative data, such as the address of the device that sent the message, the address to which the message was sent, and the like. SMS event gateway 207 extracts information from the message, such as the message content, the source address, and the target address, and packages the information into an AS Event object or message. SMS event gateway 207 sends this AS Event package to event gateway service 210 of application server 200. An SMS AS Event object or package may include information, such as the message, the source address, and the destination address.

Within application server 200, event gateway service 210 is software code within application server 200 that queues up each AS Event package received from an event gateway instance, such as event gateways 207-209, for submission to the specific application server function requested by the event. As a developer installs a particular event gateway instance, it is registered with event gateway service 210 along with the particular application server component or function that it is associated with. Thus, as an AS Event arrives at event gateway service 210, it determines to which of application server code 201-203 the AS Event message is to be sent and queues the AS Event message for delivery to that application server function.

It should be noted that in various embodiments of the present invention, the functionality of event gateway service 210 may be divided or assigned to another component of a gateway application server configured according to the various embodiments.

The AS Event package, sent by SMS event gateway 207, is queued by event gateway service 210 for delivery to application server code 201. When SMS event gateway 207 first receives the AS Event package, it checks its configuration to determine which of the available application server functions, such as application server code 201-203, the AS Event is directed. Because each event gateway instance is associated with one or more application server functions, its configuration will contain a list of such functions to send the AS Events. In the example described with respect to FIG. 2, event gateway service 210 determines that the AS Event message is associated with application server code 201. After the AS Event package makes its way through the queue, it is sent to application server code 201. Application server code 201 receives the AS Event package as a valid input and uses the data packaged therein from the original event message in executing its functionality.

Once application server code 201 executes its functionality using the data from the AS Event, it returns a message, i.e., the resulting data, to event gateway service 210. For purposes of example, application server code 201 may implement a telephone directory application. A user, sending an SMS message from the user's mobile device, requests a particular phone number. The SMS message is received at SMS event gateway 207, re-packaged into an AS Event message, and sent to event gateway service 210. Event gateway service 210 sends this AS Event message to application server code 201. Application server code 201 uses the text entered by the user, now contained in the AS Event message, to locate the matching phone number. It then sends the resulting phone number as a message back to event gateway service 210. Event gateway service 210 packages the phone number into an AS Event format/protocol and returns it to SMS event gateway 207. SMS event gateway 207 strips out the resulting phone number data in the AS Event message and re-packages it into a properly formed SMPP message that includes in its message content, the resulting phone number. SMS event gateway 207 then sends the SMPP message back to the requesting user's mobile device. The targeted mobile device extracts the phone number and displays it to the user.

It should be noted that in alternative embodiments of the present invention, the event gateway application may or may not issue responsive messages. An event gateway application may simply receive a message from an external source, may receive a message and issues a response, or also may initiate a message to an external device, either with or without response from the external device.

It should further be noted that in additional and/or alternative embodiments of the present invention, an event gateway instance may be configured to send AS Events to more than one event gateway application. For example, referring to FIG. 2, IM event gateway 208 may be configured to send its AS Events to application server code 201 and 202. The relationship between the gateways and gateway applications may be determined as desired and created by the application and system designers.

Because application server code 201 has been coded as a standard application server component, other applications may also access its functionality if additional gateway types are provided. For example, an instant message user may send an instant message to IM server 205 requesting a certain phone number. The IM message is transmitted using an IM protocol, such as XMPP, to IM event gateway 208, which is an instance of a gateway type specifically designed to listen for XMPP. IM event gateway 208 strips out the selected data from the IM message and re-packages it into an AS Event message format. The AS Event message is then delivered to application sever code 201 through event gateway service 210. Application server code 201 uses the same type of data from this AS Event message as was used in the SMS AS Event message to determine the requested phone number. The resulting phone number is then re-packaged into an AS Event message at event gateway service 210 and then re-packaged into an XMPP IM message at IM event gateway 208. This IM message will be sent back to IM server 205 for delivery to the user's IM account.

Similarly, a user at computer 211 running a Web browser may issue an HTTP request directly to application server 100. Because the user's Web browser is already capable of interacting with application servers using HTTP, no intervening, specialized event gateway is necessary. Application server 100 then internally calls application server code 201 with the appropriate data and provides the available functionality. Therefore, application server logic, components, and/or applications Coded for use in the standard application server-client architecture may now be re-used by non-traditional access methods in an application server configured according to the embodiment of the present invention described in FIG. 2.

It should be noted that in various embodiments of the present invention, a particular event gateway instance is associated with a specific application server function, component, and/or code set. For example, the event gateway instance illustrated as SMS event gateway 207 is associated with application server code 201. An SMS message received by SMS event gateway 207 for performing the functionality defined by application server code 201 will be passed, after re-packaging, from SMS event gateway 207 to application server code 201. However, an SMS message received by SMS event gateway 207 attempting to execute the functionality defined by application server code 202 will not be processed because the information in the configuration of SMS event gateway 207 will not direct it to forward such messages.

It should also be noted that in additional and/or alternative embodiments of the present invention, the event gateway instances, such as IM event gateway 208 may be coded to examine the destination or target address within the external event in order to determine which event gateway application to send the corresponding AS Event message. In such selected embodiments, the distribution of AS Event messages may become more dynamic.

Figure 3:
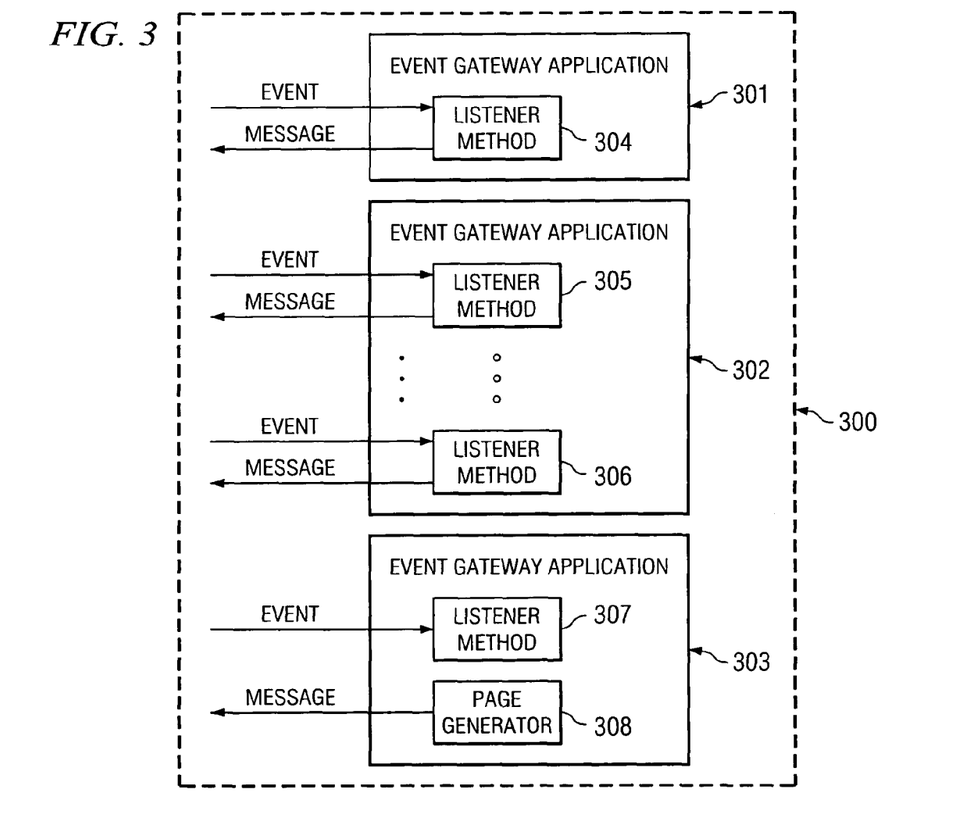
FIG. 3 is a block diagram illustrating an application server configured according to one embodiment of the present invention.

FIG. 3 is a block diagram illustrating application server 300 configured according to one embodiment of the present invention. Application server 300 shows selected details from three event gateway applications, event gateway applications 301-303. As illustrated, each of event gateway applications 301-303 includes at least one listener method, listener methods 304-307. A listener method within an event gateway application is a set of code that defines one or more software methods that respond to incoming messages from one or more event gateway instances. It receives an AS Event message and processes the contents of that message according to the event gateway application logic. Depending on the configuration, a listener method may also cause a message to be sent back to the event gateway.

An event gateway application, such as event gateway application 301, may contain a single listener method, such as listener method 304. In such applications, the listener method is typically triggered by receiving a message from an associated event gateway. For example, listener method 304 may be called onIncomingMessage. Event gateway application 301 also does not send a message back to the external event source. Event gateway application 301 merely receives the AS Event object from the event gateway and performs some processing on that information. Other event gateway applications, such as event gateway application 302, may contain multiple listener methods, such as listener methods 305-306. For example, event gateway application 302 may be an IM-related application. The event gateway associated with event gateway application 302 would have a first listener method, listener method 305, that defines a reaction to incoming messages, similar to the onIncomingMessage method defined with respect to listener method 304. It would also include listener method 306 to control the adding of buddies onto an IM buddy list. Such a method may be called onAddBuddyRequest.

It should be noted that the example names given for the described listener methods are merely exemplary and are not intended to limit the naming conventions of any software code used to implement the various embodiments of the present invention.

Unlike existing application server technology, which is typically a synchronous client-server/request-response framework, event gateway applications configured for operation on application servers, such as application server 300, may be asynchronous and either respond to external requests or initiate messages to send to external sources. Event gateway application 303 is an example of a message-initiating gateway application. For example, gateway application 303 maybe an IM application. A user of the Web page generated by page generator 308 enters a message for an external user.

Page generator 308 uses the address information provided by the page user to generate an outgoing message addressed to the external user. The message is transmitted to the event gateway designated for event gateway application 303. The event gateway re-packages the message into the appropriate IM protocol for transmitting to the targeted device or entity. Event gateway application 303 also includes a listener method, listener method 307. Instead of listening for messages initiated from the external event source, listener method 307 listens for a response message from the targeted device or entity sent after event gateway application 303 transmits its message externally. However, because event gateway application 303 operates asynchronously, it may continue further processing without first receiving a response message from the targeted device. Therefore, the IM user at event gateway application 303 may continue using the IM system even if the external user does not respond.

The data that is passed between an event gateway and an event gateway application is formatted, at some point in the path, as an AS Event message. The AS Event message defines a structure for the data being handled by the event gateway application. In some embodiments, the AS Event may comprise a JAVA™ object created by the event gateway that has the data structure defined by the gateway developer. Depending on the application and medium being used, AS Event messages may contain various different types and combinations of data. In SMS applications, the AS Event message may comprise the message, the source address, and the target address. Other applications, such as IM applications, may comprise the message, the sender identification, the recipient identification, and a timestamp. Thus, the content of the AS Event object/message is not a static construct. It may develop according to the application designers' needs.

Figure 4:
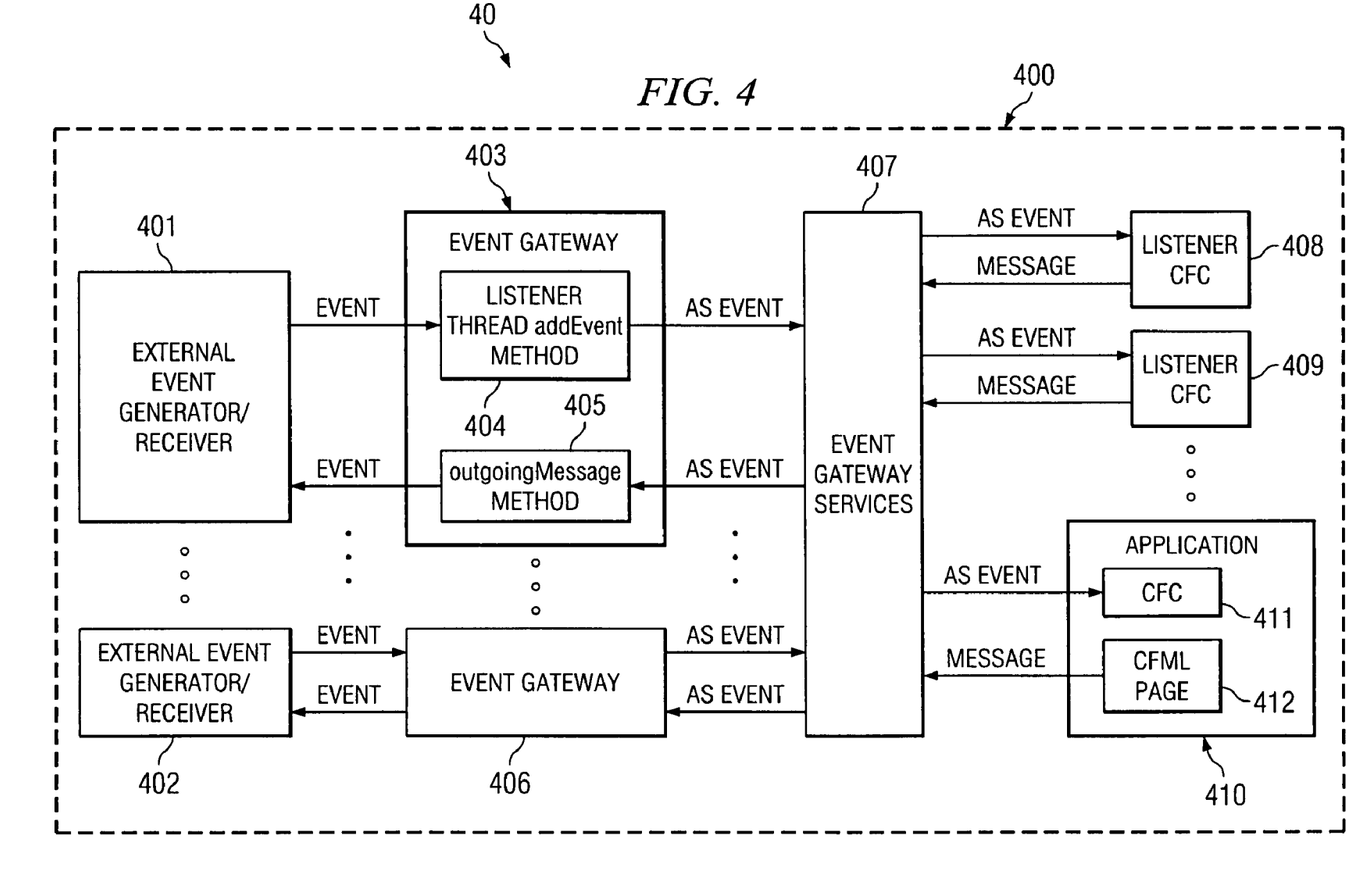
FIG. 4 is a block diagram of an application server configured according to one embodiment of the present invention.

FIG. 4 is a block diagram of application server 400 configured according to one embodiment of the present invention. For purposes of this example, application server 400 is a COLDFUSION™ application server. In operation of a responding-type event gateway application, such as that represented by listener CFC 408, external event generator/receiver 401 sends an event message to application server 400. Application server 400 determines the transport protocol or format of the incoming event along with the identification of the target event gateway application and passes the incoming event message to the corresponding event gateway instance. Application server 400 passes the incoming event message to event gateway 403. Listener thread addEvent message 404 within event gateway 403 detects the protocol of the incoming event message and uses selected data from the event message to create an AS Event struct. The AS Event struct is passed to event gateway services 407 which determines which of the event gateway applications, listener CFC 408, the AS Event struct from event gateway 407 is associated with. Once this is determined, the AS Event struct is queued for delivery to listener CFC 408.

Listener CFC 408 uses the data from the AS Event struct to perform its coded logic or processing. It also includes an outgoing message capability that sends a message targeted to external event generator/receiver 401. The message is received by event gateway services 407 which re-packages the responsive message into an AS Event struct. Event gateway services 407 then calls the outgoing method of event gateway 403, outgoingMessage method 405, using the AS Event struct. OutgoingMessage method 405 re-packages the data from the AS Event struct into a message in the native format or protocol of external event generator/receiver 401 and sends the message response to external event generator/receiver 401. Therefore, multiple external event generators, such as external event generator/receivers 401 and 402, may access various event gateway applications, such as listener CFCs 408 and 409 and event gateway application 410, with CFC 411 and CFML page 412, through various instances of gateway types, such as event gateways 403 and 406.

The various event generating technologies communicate in various non-HTTP protocols. SMS technology was developed using SMS-specific platforms having its own specific logic and programming techniques and methods for implementing SMS applications. Similarly, IM technology was developed using IM-specific platforms having their own specific logic and programming techniques and methods for implementing IM applications. This platform-specific development paradigm was a typical way for developing various technologies. Not until open access or universally accessible technologies began to advance, did open source or universal logic or programming techniques develop. Thus, even though different embodiments of the present invention allow different external event source technologies using transport mechanisms, such as SMS, IM, JMS, TCP/IP sockets, and the like, to access application server technologies, application server technology does not necessarily include logic and programming methods that would be used in controlling the specific features of the non-application server, non-HTTP technologies. If not addressed, this limitation may cause certain features to be inaccessible to the event gateway application programmer.

Alternative embodiments of the present invention create helper methods that expose atypical application server logic to application server programmers and developers. Within an event gateway, the event gateway developer codes methods that expose some of the methods used in the external event generating systems. For example, IM systems have extensive management features for buddies and buddy lists. This technology is not typical for application servers. Thus, the IM event gateway developer may provide such methods within the gateway for the event gateway application to access. Similarly, TCP/IP-related applications deal with starting and ending socket connections. Thus, the IP socket event gateway developers code methods for starting and ending IP sockets that are accessible to the event gateway applications in the event gateway.

Figure 5:
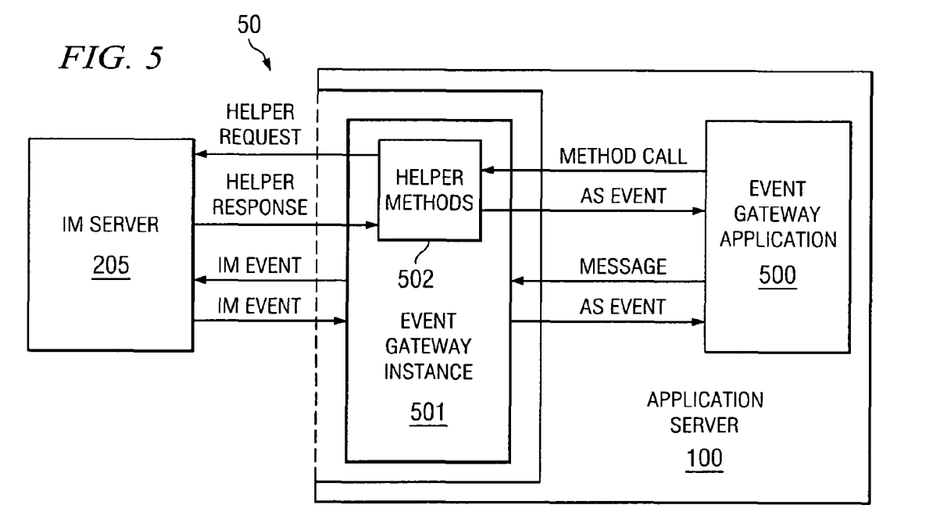
FIG. 5 is a block diagram illustrating an event gateway architecture configured according to one embodiment of the present invention.

FIG. 5 is a block diagram illustrating event gateway architecture 50 configured according to one embodiment of the present invention. Application server 100 includes event gateway application 500 and event gateway instance 501, which utilizes helper methods 502 for providing additional IM system functionality to event gateway application 500.

In operation, an event is generated and sent from IM server 205 to application server 100. Event gateway instance 501 is coded to listen for events using XMPP protocol. When the event is detected, event gateway instance 501 determines that it is properly addressed to event gateway application 500 and, thereafter, causes select portions of the data it contains to be re-packaged into an AS Event object for event gateway application 500. This AS Event message is then transmitted to event gateway application 500. Event gateway application 500 uses the data from the AS Event to execute its functionality. For purposes of FIG. 5, event gateway application 500 is an IM-related application that includes methods for managing the buddy lists that come with IM services. However, application server programming functions, methods, and techniques typically cannot affect IM services. Because IM services deal considerably with buddies and buddy lists, event gateway instance 501 includes helper methods class 502 to expose the buddy management methods of IM systems to regular application server users.

When additional functionality becomes desirable, such as the adding of buddies to a buddy list, event gateway application 500 determines that it should access helper methods 502, in order to effectuate the addition of the buddy to the list. Event gateway application 500 calls the add buddy method through helper methods class 502. The helper message is communicated back to IM server 205 in order to add the buddy to the user's list. Because event gateway application 500 is capable of asynchronous operation, once the call to the add buddy method is made through helper methods class 502, event gateway application 500 may continue processing or executing additional functionality.

It should be noted that the implementation or execution of helper methods may be triggered in response to receiving an AS Event message from an external source, via an event gateway, or may be initiated through the processing of an event gateway application. The described embodiments are not intended to limit operation to one or the other types of access.

It should be noted that while the descriptions herein of the various embodiments of the present invention have noted external event sources as being SMSC servers, IM server, and/or file systems, the various embodiments of the present invention may be implemented with any external entity for which an event gateway may be developed. Additional external event sources, such as database management systems (DBMS), JAVA™ Messaging Service (JMS) entities, and the like. Application developers may develop such event gateways by creating an event listening method that detects the receipt of a data message configured in a particular format and/or protocol, a method for extracting certain data from the data message and re-packaging it into a standard format that can be used to call the event data application. Additional or alternative event gateways may include more extensive logic and/or helper methods for providing additional functionality.

Figure 6:
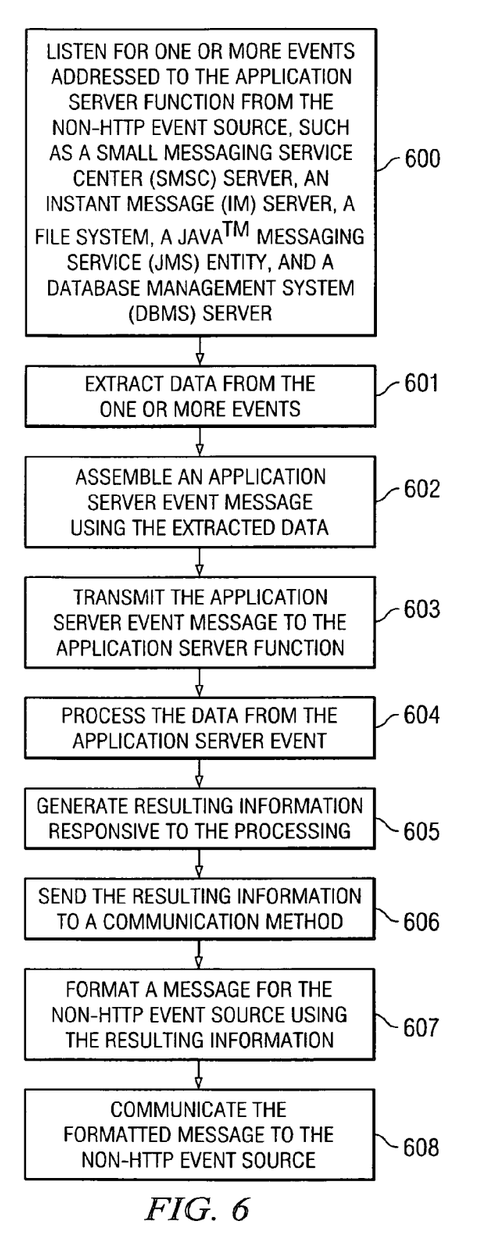
FIG. 6 is a flowchart illustrating example steps executed in implementing one embodiment of the present invention in which an event is originated at a non-HTTP event source.

FIG. 6 is a flowchart illustrating example steps executed in implementing one embodiment of the present invention in which an event is originated at a non-HTTP event source. In step 600, one or more events addressed to the application server function are listened for from the non-HTTP event source, such as a Small Messaging Service Center (SMSC) server, an Instant Message (IM) server, a file system, a JAVA™ Messaging Service (JMS) entity, and a database management system (DBMS) server. Data is extracted from the one or more events in step 601. An application server event message is assembled, in step 602, using the extracted data. The application server event message is transmitted, in step 603, to the application server function. In step 604, the data from the application server event is processed by the application server function. Resulting information is then generated, in step 605, responsive to the processing. This resulting information is sent to a communication method in step 606. A message is formatted, in step 607, for the non-HTTP event source using the resulting information. The formatted message is communicated to the non-HTTP event source in step 608.

It should be noted that in alternative embodiments, the application server function may not generate a response message for the non-HTTP event source. In such embodiments, steps 604-607 would not be executed.

Figure 7:
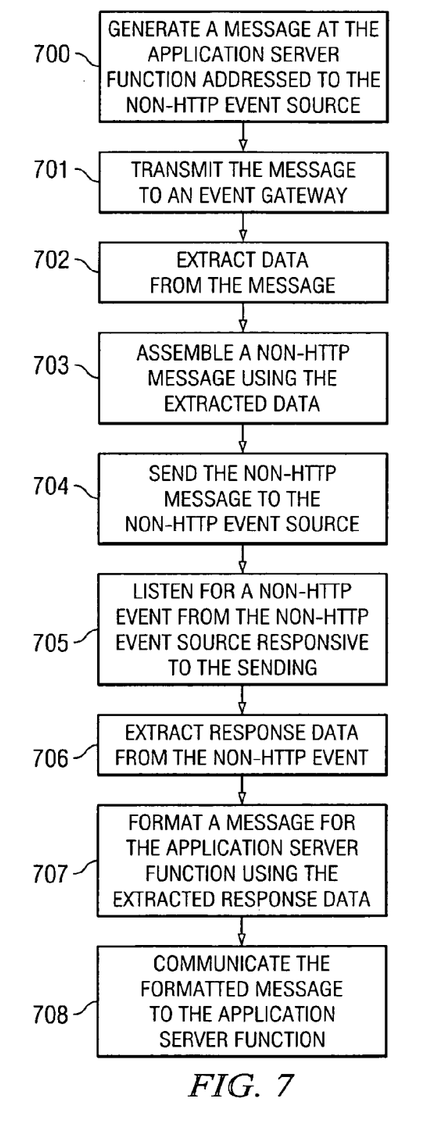
FIG. 7 is a flowchart illustrating steps executed in implementing another embodiment of the present invention in which a message or event is originated or initiated at the application server function.

FIG. 7 is a flowchart illustrating steps executed in implementing another embodiment of the present invention in which a message or event is originated or initiated at the application server function. In step 700, a message is generated at the application server function addressed to the non-HTTP event source. The message is transmitted, in step 701, to an event gateway. Data is extracted from the message in step 702. A non-HTTP message is assembled, in step 703, using the extracted data. The non-HTTP message is sent to the non-HTTP event source in step 704. A non-HTTP event is listened for, in step 705, from the non-HTTP event source responsive to the sending. Response data is extracted, in step 706, from the non-HTTP event. A message is formatted for the application server function using the extracted response data in step 707. In step 708, the formatted message is communicated to the application server function.

It should be noted that in alternative embodiments, the application server function may not be coded to receive an acknowledgement or response message from the non-HTTP event source. In such embodiments, steps 705-708 would not be executed.

The program or code segments making up the various embodiments of the present invention may be stored in a computer readable medium or transmitted by a computer data signal embodied in a carrier wave, or a signal modulated by a carrier, over a transmission medium. The "computer readable medium" may include any medium that can store or transfer information. Examples of the computer readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, and the like. The computer data signal may include any signal that can propagate over a transmission medium such as electronic network channels, optical fibers, air, electromagnetic, RF links, and the like. The code segments may be downloaded via computer networks such as the Internet, Intranet, and the like.

Figure 8:
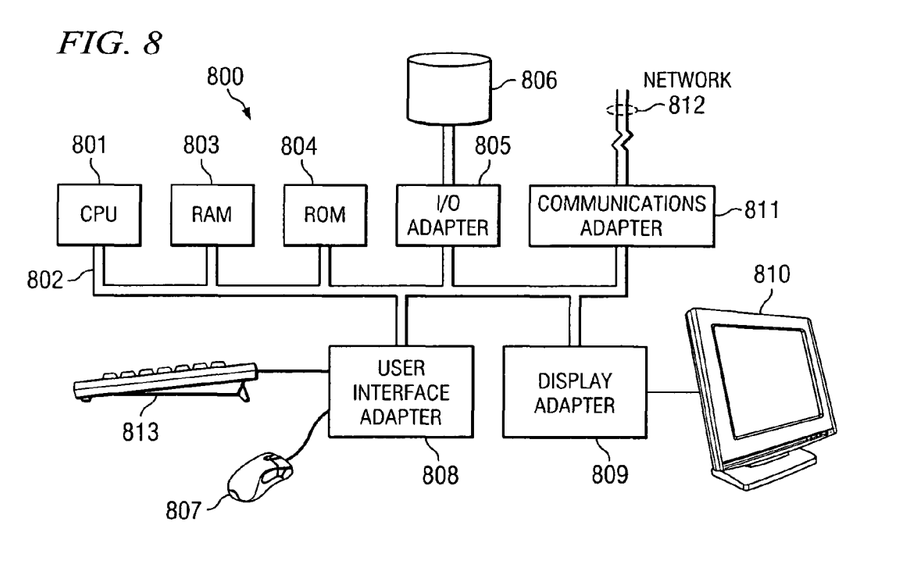
FIG. 8 illustrates a computer system adapted to use embodiments of the present invention.

FIG. 8 illustrates computer system 800 adapted to use embodiments of the present invention, e.g. storing and/or executing software associated with the embodiments. Central processing unit (CPU) 801 is coupled to system bus 802. The CPU 801 may be any general purpose CPU. However, embodiments of the present invention are not restricted by the architecture of CPU 801 as long as CPU 801 supports the inventive operations as described herein. Bus 802 is coupled to random access memory (RAM) 803, which may be SRAM, DRAM, or SDRAM. ROM 804 is also coupled to bus 802, which may be PROM, EPROM, or EEPROM. RAM 803 and ROM 804 hold user and system data and programs as is well known in the art.

Bus 802 is also coupled to input/output (I/O) controller card 805, communications adapter card 811, user interface card 808, and display card 809. The I/O adapter card 805 connects storage devices 806, such as one or more of a hard drive, a CD drive, a floppy disk drive, a tape drive, to computer system 800. The I/O adapter 805 is also connected to a printer (not shown), which would allow the system to print paper copies of information such as documents, photographs, articles, and the like. Note that the printer may be a printer (e.g., dot matrix, laser, and the like), a fax machine, scanner, or a copier machine. Communications card 811 is adapted to couple the computer system 800 to a network 812, which may be one or more of a telephone network, a local (LAN) and/or a wide-area (WAN) network, an Ethernet network, and/or the Internet network. User interface card 808 couples user input devices, such as keyboard 813, pointing device 807, and the like, to the computer system 800. The display card 809 is driven by CPU 801 to control the display on display device 810.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An application server comprising a processor and a memory, the memory embodying program components comprising:
    a first functional component configured to provide a first application server function and to communicate using an application server event format;
    a second functional component configured to provide a second application server function and to communicate using the application server event format;
    a communication component configured to receive an HTTP request comprising data provided by a requesting client, invoke at least one of the first or second functional components using the data, and provide an HTTP response comprising data returned by the functional component to the requesting client;
    a first gateway configured to interface with an external event source using a first non-HTTP protocol, receive data via the first non-HTTP protocol, and provide a message in the application server format, the message including at least some of the data received via the first non-HTTP protocol;
    a second gateway configured to interface with an external event source using a second non-HTTP protocol, receive data via the second non-HTTP protocol, and provide a message in the application server event format, the message including at least some of the data received via the second non-HTTP protocol; and
    an event gateway service module configured to receive messages provided by the first and second gateways and to identify, based on determining the gateway from which the message was received, which of at least one of the first functional component and the second functional component to invoke and to relay the received message to the identified functional component or components,
    wherein the application server event format is different from the non-HTTP protocols and a format of the HTTP request.

2. The application server set forth in claim 1, wherein the application server event format is defined in an application programming interface for the application server.

3. The application server set forth in claim 1, wherein the gateway is configured to interface directly with the functional component to thereby avoid conversion of data received via the non-HTTP protocol to HTTP when passing data to the functional component.

4. The application server set forth in claim 1, wherein the event gateway service module is configured to identify which of at least one of the first functional component and second functional component to invoke by accessing a registry, the registry associating each gateway with at least one of the functional components.

5. The application server set forth in claim 1, wherein the first non-HTTP protocol and the second non-HTTP protocol each comprise a different one of:
    a Small Messaging Service protocol;
    an Instant Message (IM) protocol;
    a file system protocol;
    a JAVA™ Messaging Service (JMS) protocol; or
    a database management system (DBMS) protocol.

6. The application server set forth in claim 1, wherein the event gateway service module is further configured to receive a message from the identified functional component in response to relaying the received message and to send an application server event to the gateway, the sent application server event based on the received message from the identified functional component.

7. A computer-implemented method comprising:
    providing, by a computing system comprising a processor and memory, an application server environment;
    executing, using the processor and within the application server environment, a plurality of event gateway instances, the plurality of instances comprising a first event gateway instance configured to interface with an external event source using a first non-HTTP protocol and a second event gateway instance configured to interface with an external event source using a second non-HTTP protocol different from the first protocol;
    executing, using the processor and within the application server environment, an event gateway service;
    receiving, by the executing event gateway service, an application server event provided by one of the plurality of event gateway instances;
    determining, by the executing event gateway service, at least one of a plurality of logic modules to which to relay the received application server event based on which gateway instance provided the application server event;
    relaying, by the executing event gateway service, the event to the determined at least one logic module; and
    executing, using the processor and within the application server environment, a function defined by the determined at least one logic module based on data included in the relayed event.

8. The computer-implemented method set forth in claim 7 wherein determining comprises:
    identifying which event gateway instance provided the application server event;
    accessing a registry associating each event gateway instance with one or more of the plurality of logic modules; and
    identifying the one or more of the plurality of logic modules associated in the registry with the event gateway instance that provided the event.

9. The computer-implemented method set forth in claim 7, further comprising:
    receiving, by the executing event gateway service, a message provided by the function after the function is executed; and
    in response to the message received from the function, sending an application server event to the event gateway service that provided the application server event that was relayed to the logic module defining the function.

10. A computer program product comprising a non-transitory computer readable medium embodying program code executable by a computing system, the code comprising:
    program code that configures a computing system to provide an execution environment for application server logic modules;

program code that configures the computing system to
provide a plurality of gateways, the plurality of gateways
comprising:
   a first gateway configured to interface with an external
      event source using a first non-HTTP protocol, receive
      data via the first non-HTTP protocol, and provide a
      message in an application server format, the message
      including at least some of the data received via the
      first non-HTTP protocol, and
   a second gateway configured to interface with an external
      event source using a second non-HTTP protocol,
      receive data via the second non-HTTP protocol, and
      provide a message in the application server event
      format, the message including at least some of the
      data received via the second non-HTTP protocol; and
program code that configures the computing system to
   provide an event gateway service module, the event
   gateway service module configured to relay a message
   received from one of the plurality of gateways to one or
   more application server logic modules by accessing a
   registry associating each event gateway with one or
   more of the application server logic modules,
wherein the application server event format is different
   from the first and second non-HTTP protocols and is
   recognized by the application server logic modules.

11. The computer program product set forth in claim 10, wherein the event gateway service module is further configured to:
   receive a message provided by an application server logic
      module in response to the relayed message from the
      event gateway service module; and
   in response to the received message, send a message to the
      gateway that provided the message that was relayed to
      the logic module.

12. An application server comprising a processor and a memory, the memory embodying program components comprising:
   a first functional component configured to provide a first
      application server function and to communicate using an
      application server event format;
   a second functional component configured to provide a
      second application server function and to communicate
      using the application server event format;
   a first gateway configured to interface with an external
      event source using a non-HTTP protocol, receive data
      via the non-HTTP protocol, and provide a message in
      the application server format, the message including at
      least some of the data received via the non-HTTP protocol;
   a second gateway configured to interface with an external
      event source using a second non-HTTP protocol different
      from the first non-HTTP protocol, receive data via
      the second non-HTTP protocol, and provide a message
      in the application server format, the message including
      at least some of the data received via the second non-HTTP
      protocol; and
   an event gateway service module configured to receive
      messages provided by the at least one gateway and to
      identify, based on determining the gateway from which
      the message was received, which of at least one of the
      first functional component and the second functional
      component to invoke and to relay the received message
      to the identified functional component or components.

* * * * *